UNITED STATES PATENT OFFICE.

EDWARD SAMUEL CHAPIN, OF NEW YORK, N. Y.

SULFUR COLOR AND PROCESS OF MAKING SAME.

No. 909,156.　　　Specification of Letters Patent.　　　Patented Jan. 12, 1909.

Application filed February 7, 1907. Serial No. 356,206.

*To all whom it may concern:*

Be it known that I, EDWARD SAMUEL CHAPIN, a citizen of the United States, and a resident of the borough of Brooklyn, city and State of New York, have made a new and useful Improvement in Sulfur Colors and Process of Making the Same, of which the following is a specification.

I have found that by heating a mixture of copper sulfate, sulfur, sodium sulfid, one of various members of the chemical group denominated "carbohydrates", and one of various members of the chemical group denominated "aromatic chemicals", I have obtained new coloring matters. These coloring matters are of remarkable concentration and are superior in tone and fastnesses to coloring matters made of the above mentioned substances, but without the use of copper sulfate.

Example: 32 grams of $Na_2S$ Conc. and 32 grams of water (or, in place of both, 64 grams of $Na_2S$ crystals), are melted to solution. 39 grams of sulfur are added, and this mass boiled to dissolve so much of the sulfur as will readily dissolve therein. I have found that the best results are obtained by employing sulfur in excess of the amount that will readily dissolve in the sulfid solution. 15 grams of solid meta-phenylene diamin (or the equivalent of the same in factory weak solution) are then added; then 9 grams of dry starch, and then 3 grams of copper sulfate crystals (blue stone) dissolved in 10 cubic centimeters of water, are added. The mass is heated to dryness. Then the temperature is raised to 140° C. and maintained at that point for one hour; it is then raised to between 300° and 350° C. and maintained at that point for about half an hour, or until the full tinctorial strength of the product is developed. The resulting dyestuff dissolves readily in cold water, cold caustic alkaline or caustic carbonate solutions to a bright rich reddish brown solution, and dyes unmordanted cotton in an alkaline salt bath reddish cutch brown shades of superior fastness.

A similar product can be obtained by using, in place of meta-phenylene diamin, either meta-di-nitrobenzene or meta-nitranilin, if sufficient sodium sulfid be added to reduce these substances to meta-phenylene diamin.

If other carbohydrates, such as grape sugar, or gum arabic be substituted for the starch in the above example; or if other aromatic chemicals, such as sulfanilic acid, be substituted for the meta-phenylene-diamin in the above example, analogous products will be obtained.

I claim,

1. The process of making a sulfur dyestuff consisting in heating a mixture of copper sulfate, sulfur, sodium sulfid, a carbohydrate, and an aromatic chemical, substantially as described.

2. The process of making a sulfur dyestuff consisting in heating a mixture of copper sulfate, sulfur, sodium sulfid, starch and an aromatic chemical, substantially as described.

3. The process of making a sulfur dyestuff consisting in heating a mixture of copper sulfate, sulfur, sodium sulfid, a carbohydrate and meta-phenylene-diamin, substantially as described.

4. The process of making a sulfur dyestuff consisting in heating a mixture of copper sulfate, sulfur, sodium sulfid, starch and meta-phenylene-diamin substantially as described.

5. As a new article of manufacture the dyestuff produced by heating a mixture of starch, meta-phenylene-diamin, copper sulfate, sulfur and sodium sulfid, substantially in the manner specified, which is readily soluble in cold water, cold caustic alkaline or caustic carbonate solutions to a bright reddish brown solution, and dyes unmordanted cotton in an alkaline salt bath reddish cutch brown shades.

In testimony whereof I have signed this specification in the presence of two subscribing witnesses.

EDWARD SAMUEL CHAPIN.

Witnesses:
　FRITZ V. BRIESEN,
　JOHN A. KEHLENBECK.